GEORGE E. LESTER
WILLIAM LESTER
INVENTORS.

April 7, 1959 G. E. LESTER ET AL 2,880,508
ARTIFICIAL DENTURE STRUCTURES
Filed July 11, 1957 2 Sheets-Sheet 2
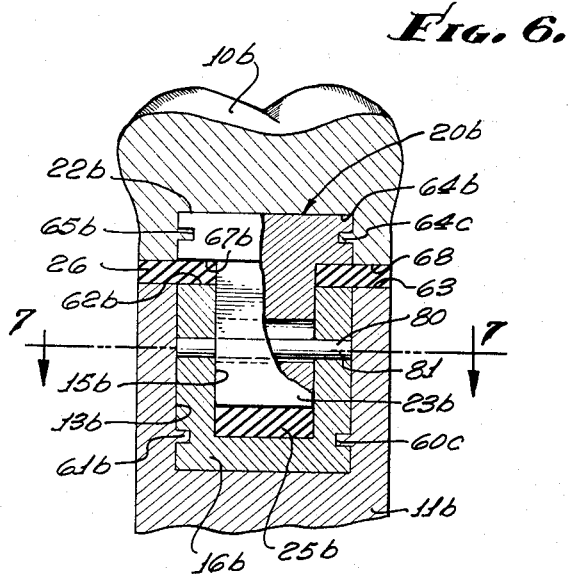
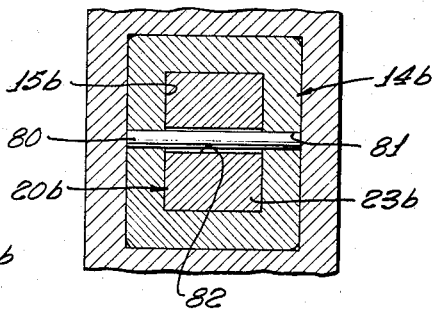
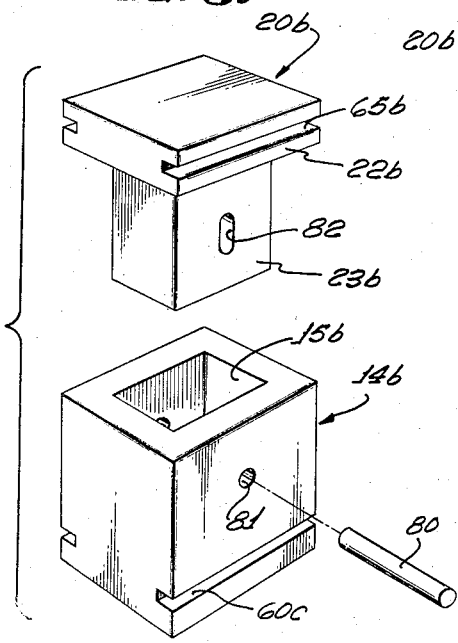
GEORGE E. LESTER
WILLIAM LESTER
INVENTORS.
BY Bernard Kriegel
ATTORNEY.

United States Patent Office 2,880,508
Patented Apr. 7, 1959

2,880,508

ARTIFICIAL DENTURE STRUCTURES

George E. Lester, Encino, and William Lester, Burbank, Calif.

Application July 11, 1957, Serial No. 671,211

17 Claims. (Cl. 32—2)

The present invention relates to artificial dentures, and more particularly to the relieving of stress in a prosthetic tooth, and in any tooth adjacent the prosthetic tooth.

The present application is a continuation-in-part of our application for "Artificial Denture Structures," Serial No. 568,039, filed February 27, 1956, and now abandoned.

An object of the present invention is to provide an improved artificial tooth structure incorporating a stress breaker to cushion biting actions and similar loads imposed on the tooth structure, as well as to prevent the structure from imposing a bending, or other substantial, stress upon an adjacent tooth, or upon adjacent teeth.

Another object of the invention is to provide a self-contained prosthetic tooth structure of comparatively simple form, which is capable of yielding under a biting action, the tooth structure being permanently sealed to prevent food, and other substances, from entering its interior.

A further object of the invention is to provide a self-contained artificial tooth structure having relatively yieldable parts to permit limited movement of the tooth under a biting action, the structure having a smooth and comparatively uninterrupted external surface, which is relatively easy to maintain in a clean and sanitary condition, its relatively yieldable parts being sealed against one another to prevent entry of food and other substances therebetween and into the interior of the structure.

An additional object of the invention is to provide an artificial tooth structure having parts which are relatively movable to a limited extent under a biting action, in which relative angular movement between such parts is prevented to maintain the proper orientation of the tooth in a person's mouth.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Refering to the drawings:

Fig. 6 is a view similar to Fig. 1 of still another embodiment of the invention;

Fig. 7 is a cross-section taken along the line 7—7 on Fig. 6;

Fig. 8 is an exploded isometric projection of parts of the tooth structure shown in Figs. 6 and 7.

Figure 1:
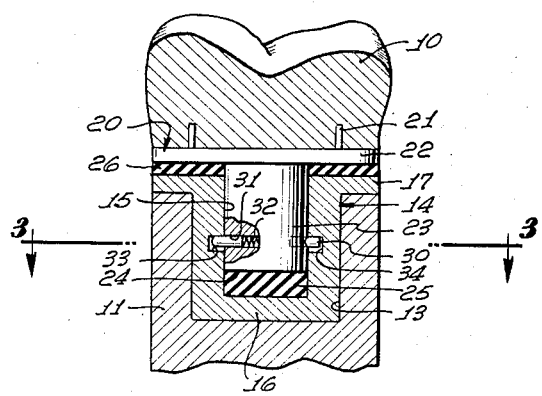
Figure 1 is a longitudinal section through an embodiment of the invention, with all of the parts in their appropriate assembled relation.

As disclosed in the drawings, artificial tooth structures are provided which include an outer tooth portion 10 to which a biting action is applied directly, and an inner portion or tooth base 11 carrying the outer portion, and by means of which the tooth structure is secured in the person's mouth. The outer tooth portion 10 is yieldably mounted with respect to the inner tooth portion, so as to be capable of limited movement against a resisting force, in order to provide a stress breaker, or shock absorber, between the outer tooth portion and the denture or tooth base, as well as between the artificial tooth structure and an adjacent tooth or adjacent teeth (not shown).

Figure 2:
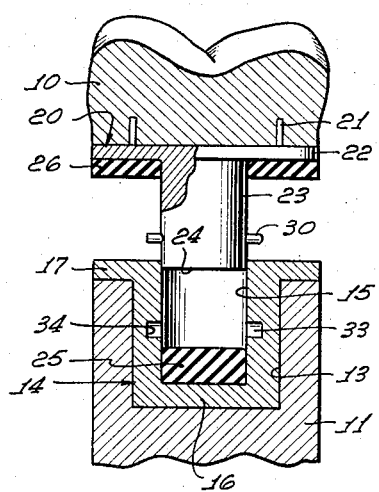
Fig. 2 is a view similar to Fig. 1, with the outer tooth portion being inserted in assembled relation to the inner tooth portion.
Figure 3:
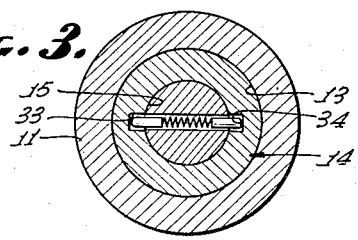
Fig. 3 is an enlarged cross-section taken along the line 3—3 on Fig. 1.

As specifically disclosed in Figs. 1, 2 and 3, the denture base 11 has a cavity 13 therein, which may be of generally cylindrical form, in which a cup-shaped outer housing member 14 is contained, this housing member being suitably secured to the denture base. The cup-shaped outer member 14 has a cylindrical bore 15 therein opening through the outer end of the cup-shaped member and terminating at an inner base 16 of the member. The outer portion of the cup-shaped member includes an outwardly directed flange 17 extending outwardly to the periphery of the base 11. The periphery of the base may be of substantially the same size and in alignment with the periphery of the adjacent part of the outer tooth member 10.

The outer tooth portion 10 of the tooth structure is secured to an inner member 20, as by being cast around upwardly projecting pins 21 extending outwardly from the base 22 of the inner member, the periphery of the base conforming to the periphery of the tooth 10 and being substantially a continuation thereof. Integral with the base 22 is a central stud or plunger 23 having an outside diameter substantially equal to the inside diameter of the cylindrical bore 15 in the outer housing member, this plunger being slidable in the bore. When the plunger 23 is inserted in the bore 15, the innermost end 24 of the plunger will engage a spring-like element 25, which may be in the form of a rubber disc or pad, contained within the cylindrical bore of the outer housing member 14 and engaging the base 16 of the latter. When the inner member 20 is inserted in the cylindrical bore 15, its inner end will engage the rubber, or similar, spring member 25. A pliant, elastic sealing gasket 26, which may be made of rubber, or rubber-like material, is also compressed between the base portion 22 of the inner member and the outer surface of the flange 17.

The stud or plunger 23 is inserted in the bore 15 of the outer housing until the inner end 24 of the plunger engages the rubber spring member 25 and the base 22 engages the gasket 26. The outer tooth portion 10 and the denture base 11 are then moved toward each other to a slight extent to place the rubber or rubber-like spring member 25 and the gasket 26 under some compression. When this occurs, the gasket and the rubber spring member are held under compression by a retainer device acting between the plunger 23 and the outer housing member 14.

As specifically disclosed, the retainer device includes oppositely directed pins 30 disposed in a radial bore 31 in the stud, there being a helical compression spring 32 between the pins urging them in an outward direction into an internal groove 33 in the inner wall of the outer member. The spring 32 shifts the pins 30 outwardly into the groove 33 when the gasket 26 and the rubber spring-like member 25 are compressed to the desired extent, the pins 30 engaging the outer side 34 of the internal groove to prevent the stud or plunger 23 from moving outwardly of the outer housing member. In this manner, the spring-like gasket member 26 and the spring-like rubber member 25 are maintained under compression. However, an inwardly directed force of sufficient magnitude, such as will occur under the biting action of the tooth, can still shift the outer tooth portion 10 and its plunger 23 inwardly to a slight extent relative to the outer housing member 14 and the denture base 11, such inward movement being resisted by the spring-like gasket 26 and spring-like rubber member 25. The inward movement is permitted, since the groove 33 is wider than the diameter of the retainer pins 30, permitting the required amount of longitudinal movement of the stud 23 relative to the cup-shaped outer member 14. When the biting force is relieved or released, the spring-like gasket and rubber member will shift the stud 23 and the outer tooth member 10 in an outward direction to the extent limited by engagement of the pins 30 with the outer side 34 of the groove, in which condition the rubber members 25, 26 are still under compression.

In assembling the tooth structure, the outer housing member 14 is cast in the denture or tooth base 11, the rubber cushion member 25 is inserted in a cylindrical bore 15, and the rubber gasket 26 is placed around the stud 24. The retainer pins 30 with the intervening spring 32 are inserted in the radial or transverse bore 31 through the stud. The pins 30 are forced inwardly against the action of the helical compression spring 32 until they are within the confines of the periphery of the stud 23, after which the stud is inserted in the bore 15, the ends of the pins 30 sliding along the inner wall of the cylindrical bore until the pins are disposed opposite the retainer grooves 33, whereupon the spring 32 forces the pins 30 outwardly, which action will occur when the gasket 26 and spring-like member 25 are under some compression.

Figure 4:
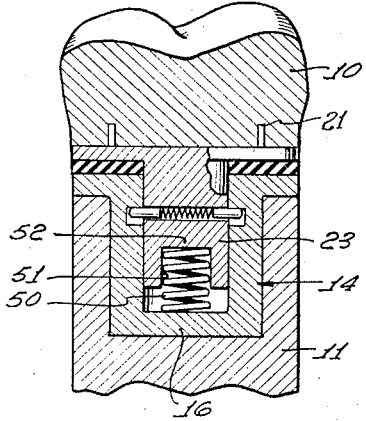
Fig. 4 is a view similar to Fig. 1 of another embodiment of the invention.

The form of invention disclosed in Fig. 4 is essentially the same as that illustrated in Figs. 1, 2 and 3. The main difference resides in the use of a helical compression spring 50 between the stud or plunger 23 and the base 16 of the outer housing member, to supply the force tending to shift the stud and outer tooth portion 10 in an outward direction, as well as tending the resist inward movement of the outer tooth portion and stud with respect to the outer housing member 14 and denture or tooth base 11. The helical compression spring 50 bears against the base 16 of the housing, its upper portion being received within a socket 51 in the inner portion of the stud and bearing against the bottom 52 of the socket. In all other respects, the artificial tooth structure disclosed in Fig. 4 is the same as disclosed in the previously described embodiment of the invention.

Figure 5:
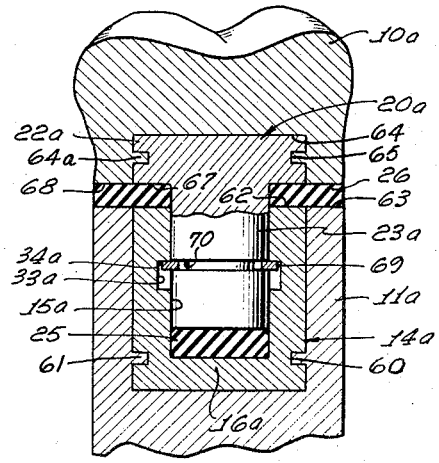
Fig. 5 is a view similar to Fig. 1 of still another form of the invention.

In the form of invention disclosed in Fig. 5, the cup-shaped housing member 14a does not have an outer flange. This cup-shaped housing member is disposed within a cavity 13a in the denture base 11a, the base being cast or molded to the outer housing member by providing a peripheral groove 60 in the inner portion of the outer housing member into which the denture base material will flow during the molding or casting operation, to provide an inwardly directed flange 61 on the denture or tooth base received within the groove. The parts 11a, 14a are thereby locked to one another.

The outer end 62 of the cup-shaped housing member terminates in the same plane as the outer end 63 of the denture base, the periphery of the denture base conforming substantially to the periphery of the outer tooth member 10a. This outer tooth member is secured, by casting or molding, to the inner member 20a, which has a stud or plunger portion 23a slidable within the cylindrical bore 15a in the outer member and an outwardly directed base or flange 22a received within a cavity 64 in the outer tooth member 10a. The base 22a of the inner member has a peripheral groove 65 therein for receiving the internal flange 64a of the outer tooth member formed during the casting or molding operation securely attaching the outer tooth member 10a to the inner member 20a. The inner transverse surface 67 of the inner member base 22a lies in substantially the same plane as the inner end 68 of the outer tooth member 10a.

In lieu of the pin and spring type of retainer employed in the other forms of the invention for holding the inner and outer members in assembled relation, a split, expansible snap ring 69 is disposed in a peripheral groove 70 in the stud or plunger, this ring being adapted to expand into an internal groove 33a in the cylindrical wall of the cup-shaped outer member 14a, and engaging the outer side 34a of the groove when the parts are assembled to one another.

In producing and assembling the prosthetic tooth disclosed in Fig. 5, the outer tooth member 10a is cast to the inner metallic member 20a, and the denture base 11a is cast to the outer housing member 14a. The rubber or rubber-like spring 25 is then disposed in the cylindrical bore 15a of the housing member and placed against its base 16a. The pliant, elastic sealing gasket 26, which functions like a rubber or rubber-like spring as well as a gasket, is disposed around the stud or plunger 23a and against the transverse surfaces 67, 68 on the base 22a and the outer member 10a. The retainer ring 69 is then inserted in the peripheral groove 70 of the stud, the retainer ring being retracted sufficiently so as to permit the stud to enter the cylindrical bore 15a and the ring 69 to slide along the wall of the latter. The stud 23a is inserted in the bore to the extent at which its inner end 24a engages the rubber spring member 25, and the rubber gasket 26 engages the outer surfaces 62, 63 of the outer housing member 14a and the denture base 11a. The outer member 10a and plunger 23a are then forced inwardly to a slight additional extent with respect to the outer housing member 14a and the denture base 11a, which will place the gasket 26 and the rubber spring-like member 25 under some compression. At that time, the split retainer ring 69 is disposed opposite the retainer groove 33a, allowing the ring to expand outwardly of the peripheral stud groove 70 to a small extent and into the internal groove 33a, the retainer ring engaging the surface 34a of the groove to hold the rubber-like members 25, 26 in compression and to prevent the parts from being disassembled.

The inner groove 33a has a length greater than the thickness of the retainer ring 69, to permit the outer tooth 10a and inner member 20a to move inwardly to a slight extent with respect to the denture base 11a and outer housing member 14a, to further compress the gasket and the rubber spring-like member. When the force on the outer tooth member 10a is removed, the spring-like gasket 26 and inner rubber member 25 will shift the outer tooth member 10a and the inner member 20a outwardly to the extent determined by engagement of the snap retainer ring 69 with the side 34a of the groove 33a.

The periphery of the gasket 26 preferably conforms to the periphery of the denture base 11a and the outer tooth member 10a, these three parts, in effect, having a continuous peripheral surface.

The form of invention disclosed in Figs. 6 to 8, inclusive, is essentially the same as the one illustrated in Fig. 5, and is capable of operating in essentially the same manner. However, there are specific differences to maintain the proper orientation of the outer tooth member 10b with respect to the denture base 11b. Such orientation is obtained in the present instance by preventing angular motion or rotation of the inner member 20b within the outer housing member 14b. In addition, inadvertent angular motion between the inner member 20b and the outer member 10b and also between the outer housing 14b and denture base 11b can be prevented.

The foregoing desirable purposes are achieved in the form of invention shown in Figs. 6 to 8, inclusive, by forming the flange 22b of the inner member of generally rectangular shape, this flange being received within a companion rectangular cavity 64b in the outer tooth member. Thus, the straight sides of the flange 22b will engage the companion straight sides of the cavity 64b in the outer tooth member, precluding angular motion between the inner member 20b and the outer tooth member 10b. In addition, the flange may be provided with the grooves 65b on opposed sides or on all of its sides into which internal ribs or flanges 64c of the outer tooth member 10b project, not only positively keying the inner member 20b to the outer tooth member 10b, but further insuring against their relative angular motion.

Angular motion between the outer housing 14b and the denture base 11b may be prevented by forming the cavity 13b therein rectangular in cross-section, the outer housing member being provided with a companion shape. In addition, the outer housing member 14b can be positively locked to the denture base 11b by providing the side grooves 60c in the outer housing member in which the inwardly directed ribs or flanges 61b of the denture base extend.

Angular motion between the inner member 20b and the outer housing 14b is prevented by forming the bore 15b in the outer member of rectangular cross-section, the stud 23b of the inner member having a companion cross-section so that the inner member can slide axially of the outer member, but is prevented from partaking of angular motion with respect thereto.

In view of the rectangular cross-section of the bore 15b and of the stud 23b, the rubber spring-like member 25b which bears upon the inner base 16b of the outer member and upon the inner end of the stud 23b will also be of rectangular section, as well as the bore through the gasket 26 surrounding the stud and engaging the ends 68, 63 of the outer tooth member and denture base, as well as the opposed faces 67b and 62b of the inner and outer members 20b, 14b.

The tooth structure illustrated in Figs. 6 to 8 is maintained in appropriate assembled relation, movement of the outer tooth member 10b and inner member 20b with respect to the outer cup-shaped housing member 14b and denture base 11b being limited by a retainer device which is of simpler construction and much stronger than the retainer devices illustrated in Figs. 1 to 5, inclusive. As shown, a retainer pin 80 extends across the outer housing 14b, its end portions fitting snugly within companion radial bores 81 provided in the wall of the outer member. The retainer pin extends through a companion elongate slot 82 projecting through the stud 23b. This slot 82 has an axial extent substantially greater than the diameter of the retainer pin, and is so located in the stud that the gasket 26 and rubber spring 25 are under some compression when the outer tooth member 10b is free from a biting or corresponding load. At this time, the lower side of the slot 82 will engage the pin 80, thereby limiting outward movement of the tooth member 10b with respect to the denture base. However, when the member 10b is subjected to an inwardly directed load, the pin and slot connection 80, 82 provided between the outer member 14b and inner member 20b permits the necessary slight inward movement of the outer tooth member 10b, the gasket 26 and rubber-like spring member 25 merely compressing to a greater extent.

In all forms of the invention, the gasket 26 is maintained at all times in sealing engagement between the outer housing member 14, 14a or 14b and the inner member 20, 20a or 20b, which will prevent food particles, and the like, from entering the space therebetween. In the forms of invention disclosed in Figs. 5 and 6, the gasket 26 also effects a seal between the opposed faces 68, 63 of the outer tooth members 10a or 10b and the inner tooth member or denture base 11a or 11b, such gasket always being in compressive engagement with such faces or surfaces. As a result, fluids and other substances cannot enter the tooth structure, the sealing gasket 26 making a permanent and continuous seal between the parts.

Not only does the gasket 26 provide a permanent seal between the parts, but it also supplements the action of the spring-like member 25 in providing a resisting force to the inward yielding of the outer tooth member and plunger with respect to the housing and the denture base. As a matter of fact, if a sufficient spring force is provided by the gasket 26, the other spring member 25 need not be used, although it is preferred that it be incorporated in the artificial tooth structures.

In the form of invention disclosed in Figs. 6 and 8, the mode of operation is the same as in the form of invention shown in Fig. 5. In addition, the several tooth components are prevented from moving angularly with respect to each other in that the inner member 20b is slidably splined to the outer housing 14b. Accordingly, the outer tooth member 10b is maintained properly oriented in the person's mouth. The retainer pin and slot arrangement 80, 82 disclosed in Figs. 6, 7 and 8 may be produced much more readily, since they are of much larger size than the corresponding retainer members shown in Figs. 1 to 5, inclusive, can be made more accurately, facilitate assembly of the entire tooth structure, and possess a much greater strength, so as to insure that the outward movement of the tooth member 10b with respect to the denture base 11b is limited to a predetermined extent, all of the parts being maintained in appropriate assembled relation.

In all forms of the invention, a comparatively simple arrangement has been provided for yieldably mounting an artificial tooth, so that it can move to a limited extent against the compressive force exerted by the spring-like members 25, 26. The movement of the tooth is substantially in a straight line, and is independent of an adjacent tooth, which might be another artificial tooth or a natural tooth. Each artificial tooth moves independently of the adjacent tooth, avoiding any bending action that might otherwise be imposed on the artificial tooth or on the adjacent tooth, or both. In the event the load on the artificial tooth increases, such as occurs under a bitting action, the resistance to its movement increases, since the compressive force of the spring-like members 25, 26 increases as the outer tooth member 10 or 10b and inner member 20, 20a or 20b are moved inwardly of the outer housing member 14, 14a or 14b and denture base 11, 11a or 11b. Such action provides yieldable resistance to the load, preventing sudden shocks from being imposed on the tooth structure. In addition, it insures a proper biting action against an opposed tooth, and on any substances between such opposed tooth and the artificial tooth.

The yieldable mounting of each tooth structure independently of any other tooth provides a stress breaker in the structure, which prevents or minimizes to a substantial extent the tendency for adjacent anchored or abutment teeth to drift from their normal positions. The yieldable mounting also relieves the pressure on a person's gums and the shock that is incident to the rigid attachment of an artificial tooth with respect to adjacent teeth in the person's mouth.

The production and assembly of the various tooth structures disclosed is relatively easy to perform, assurance being had that when assembled the tooth will have the necessary yieldability, and will be sealed against entry of foreign substances between the various parts. The exterior of the composite artificial tooth structure is smooth and presents unbroken lines, making it comparatively easy to mount in a person's mouth and to maintain in a clean and sanitary condition.

The inventors claim:

1. In prosthetic tooth structures: a denture base component; an artificial tooth component; an outer member secured to one of said components and having a bore therein; an inner member secured to the other of said components and slidable longitudinally in said bore; a pliant, elastic gasket between said members and extending outwardly substantially as far as the periphery of said tooth component to provide a seal between said members preventing substances from passing between said members; and retainer means on said members to maintain said members and components in assembled relation with said gasket under compression.

2. In prosthetic tooth structures: a denture base component; an artificial tooth component; an outer member secured to one of said components and having a bore therein; an inner member secured to the other of said components and slidable longitudinally in said bore; a pliant, elastic gasket between said members and extending outwardly substantially as far as the periphery of said tooth component; spring means in said bore and engaging said inner and outer members to urge said tooth component in a direction outwardly of said denture base component; and retainer means in said members to maintain said members and components in assembled relation with said gasket and spring means under compression.

3. In prosthetic tooth structures: a denture base; an artificial tooth; an outer member secured to said base and having a bore therein; an inner member secured to said tooth and slidable longitudinally in said bore; a pliant, elastic gasket between said members and extending outwardly substantially as far as the periphery of said tooth to provide a seal between said members preventing substances from passing between said members; and retainer means on said members to maintain said members, denture base and tooth in assembled relation with said gasket under compression.

4. In prosthetic tooth structures: a denture base component; an artificial tooth component; an outer member secured to one of said components and having a bore therein; an inner member secured to the other of said components and slidable longitudinally in said bore, said inner member having an outwardly directed base; a pliant, elastic gasket between and engaging said base and said outer member and extending outwardly substantially as far as the periphery of said tooth component to provide a seal between said members preventing substances from passing between said members; and retainer means on said members to maintain said members and components in assembled relation with said gasket under compression.

5. In prosthetic tooth structures: a denture base component; an artificial tooth component; an outer member secured to one of said components and having a bore therein; an inner member secured to the other of said components and slidable longitudinally in said bore, said inner member having an outwardly directed base provided with a transverse surface lying in substantially the same plane as a transverse surface of said other of said components, said transverse surface of said other of said components extending to the periphery of said other component; a pliant, elastic gasket between and engaging said transverse surfaces and said outer member and extending outwardly as far as the periphery of said tooth component; and retainer means on said members to maintain said members and components in assembled relation with said gasket under compression.

6. In prosthetic tooth structures: a denture base; an artificial tooth; an outer member secured to said base and having a bore therein; an inner member secured to said tooth and slidable longitudinally in said bore, said inner member having an outwardly directed base provided with a transverse surface lying in substantially the same plane as a transverse surface of said tooth, said transverse surface of said tooth extending to the periphery of said tooth; a pliant, elastic gasket between and engaging said transverse surfaces and said outer member and extending outwardly as far as the periphery of said tooth; and retainer means on said members to maintain said members, base and tooth in assembled relation with said gasket under compression.

7. In prosthetic tooth structures: a denture base component; an artificial tooth component; an outer member secured to one of said components and having a bore therein; an inner member secured to the other of said components and slidable longitudinally in said bore, said inner member having an outwardly directed base provided with a transverse surface lying in substantially the same plane as a transverse surface of said other of said components, said transverse surface of said other of said components extending to the periphery of said other component; said outer member having a transverse end surface lying in substantially the same plane as an end surface of said one of said components, said transverse surfaces of said inner member and said other component being opposite said transverse surfaces of said outer member and said one component; a pliant, elastic gasket between and engaging said opposed transverse surfaces; and retainer means on said members to maintain said members and components in assembled relation with said gasket under compression.

8. In prosthetic tooth structures: a denture base; an artificial tooth; an outer member secured to said base and having a bore therein; an inner member secured to said tooth and slidable longitudinally in said bore, said inner member having an outwardly directed base provided with a transverse surface lying in substantially the same plane as a transverse surface of said tooth, said transverse surface of said tooth extending to the periphery of said tooth; said outer member having a transverse end surface lying in substantially the same plane as an end surface of said base, said transverse surfaces of said inner member and said tooth being opposite said transverse surfaces of said outer member and said base; a pliant, elastic gasket between and engaging said opposed transverse surfaces; and retainer means on said members to maintain said members, base and tooth in assembled relation with said gasket under compression.

9. In prosthetic tooth structures: a denture base; an artificial tooth; an outer member secured to said base and having a bore therein; an inner member secured to said tooth and slidable longitudinally in said bore, said inner member having an outwardly directed base provided with a transverse surface lying in substantially the same plane as a transverse surface of said tooth, said transverse surface of said tooth extending to the periphery of said tooth; said outer member having a transverse end surface lying in substantially the same plane as an end surface of said base, said transverse surfaces of said inner member and said tooth being opposite said transverse surfaces of said outer member and said base; a pliant, elastic gasket between and engaging said opposed transverse surfaces and extending outwardly substantially as far as the peripheries of said base and tooth; spring means in said bore and engaging said inner and outer members to urge said tooth in a direction outwardly of said base, and retainer means on said members to maintain said members, base and tooth in assembled relation with said gasket and spring means under compression.

10. In a prosthetic tooth structure: a denture base; an artificial tooth; an outer member secured to said base and having a bore therein; said outer member having a flange at its outer end extending outwardly across said base; an inner member secured to said tooth and slidable longitudinally in said bore, said inner member having an outwardly directed base extending substantially to the periphery of said tooth and being disposed opposite said flange of said outer member; a pliant, elastic gasket between and engaging said base and flange and extending outwardly substantially as far as the periphery of said tooth; spring means in said bore and engaging said inner and outer members to urge said tooth in a direction outwardly of said denture base; and retainer means on said members to maintain said members, denture base and tooth in assembled relation with said gasket and spring means under compression.

11. In prosthetic tooth structures: a denture base component; an artificial tooth component; an outer member secured to one of said components and having a non-circular bore therein; an inner member secured to the other of said components and having a portion companion to said bore and slidable longitudinally therein; a pliant, elastic gasket between and engaging said members; and retainer means on said members to maintain said members and components in assembled relation with said gasket under compression.

12. In prosthetic tooth structures: a denture base component; an artificial tooth component; an outer member secured to one of said components and having a bore therein; an inner member secured to the other of said components and having a portion disposed in said bore and slidably splined to said one component so as to be axially movable therein and non-rotatable relative thereto; a pliant, elastic gasket between and engaging said members to provide a seal between said members preventing substances from passing between said members; and retainer means on said members to maintain said members and components in assembled relation with said gasket under compression.

13. In prosthetic tooth structures: a denture base component; an artificial tooth component; an outer member secured to one of said components and having a rectangular bore therein; an inner member secured to the other of said components and having a rectangular portion slidable longitudinally in said bore; a pliant, elastic gasket between and engaging said members; and retainer means on said members to maintain said members and components in assembled relation with said gasket under compression.

14. In prosthetic tooth structures: a denture base component; an artificial tooth component; an outer member secured to one of said components and having a bore therein; an inner member secured to the other of said components and slidable longitudinally in said bore; a pliant, elastic gasket between said members to provide a seal between said members preventing substances from passing between said members; one of said members having an elongate slot therein; and a pin on the other of said members disposed in said slot and engageable with said one member to maintain said members and components in assembled relation with said gasket under compression.

15. In prosthetic tooth structures: a denture base component; an artificial tooth component; an outer member secured to one of said components and having a bore therein; an inner member secured to the other of said components and slidable longitudinally in said bore; a pliant, elastic gasket between said members to provide a seal between said members preventing substances from passing between said members; said inner member having an elongate slot therein; and a pin on said outer member disposed in said slot and engageable with said inner member to maintain said members and components in assembled relation with said gasket under compression.

16. In prosthetic tooth structures: a denture base component; an artificial tooth component; an outer member secured to one of said components and having a non-circular bore therein; an inner member secured to the other of said components and having a portion companion to said bore and slidable longitudinally therein; a pliant, elastic gasket between and engaging said members; one of said members having an elongate slot therein; and a pin on the other of said members disposed in said slot and engageable with said one member to maintain said members and components in assembled relation with said gasket under compression.

17. In prosthetic tooth structures: a denture base component; an artificial tooth component; an outer member secured to one of said components and having a non-circular bore therein; an inner member secured to the other of said components and having a portion companion to said bore and slidable longitudinally therein; a pliant, elastic gasket between and engaging said members; said inner member having an elongate slot therein; and a pin on said outer member disposed in said slot and engageable with said inner member to maintain said members and components in assembled relation with said gasket under compression.

References Cited in the file of this patent

UNITED STATES PATENTS

| | | |
|---|---|---|
| 2,577,769 | Kane | Dec. 11, 1951 |

FOREIGN PATENTS

| | | |
|---|---|---|
| 838,476 | Germany | May 8, 1952 |
| 494,239 | Italy | May 18, 1954 |